United States Patent
Mahapatra et al.

(10) Patent No.: US 8,943,641 B2
(45) Date of Patent: Feb. 3, 2015

(54) METHOD AND APPARATUS FOR CLEANING A FIBER OPTIC CONNECTOR END FACE

(75) Inventors: Amaresh Mahapatra, Acton, MA (US); Stephen M. O'Riorden, Stowe, MA (US)

(73) Assignee: Linden Photonics, Inc., Westford, MA (US)

( * ) Notice: Subject to any disclaimer, the term of this patent is extended or adjusted under 35 U.S.C. 154(b) by 559 days.

(21) Appl. No.: 13/118,517

(22) Filed: May 30, 2011

(65) Prior Publication Data

US 2011/0297184 A1    Dec. 8, 2011

Related U.S. Application Data

(60) Provisional application No. 61/350,983, filed on Jun. 3, 2010.

(51) Int. Cl.

| | |
|---|---|
| *A47L 13/25* | (2006.01) |
| *B08B 1/00* | (2006.01) |
| *B82Y 10/00* | (2011.01) |
| *B82Y 20/00* | (2011.01) |
| *G02B 6/38* | (2006.01) |

(52) U.S. Cl.
CPC ............... *B08B 1/003* (2013.01); *B82Y 10/00* (2013.01); *B82Y 20/00* (2013.01); *G02B 6/3866* (2013.01); *B08B 2240/02* (2013.01)
USPC ....... 15/210.1; 15/208; 15/209.1; 15/104.001

(58) Field of Classification Search
CPC .......................... G02B 6/3866; B08B 2240/02
USPC ............ 15/209.1, 210.1, 97.1, 208, 104.001; 604/1
See application file for complete search history.

(56) References Cited

U.S. PATENT DOCUMENTS

| | | | |
|---|---|---|---|
| 5,117,528 A | 6/1992 | Kanayama et al. | |
| 6,681,437 B1 * | 1/2004 | Miyake et al. | 15/210.1 |
| 6,695,802 B1 * | 2/2004 | Thompson | 604/1 |
| 7,008,392 B2 * | 3/2006 | Beaudry | 604/1 |
| 7,097,629 B2 * | 8/2006 | Blair | 604/1 |
| 7,160,689 B2 * | 1/2007 | Matsumoto et al. | 435/7.34 |
| 7,401,374 B2 * | 7/2008 | Tourigny | 15/104.001 |
| 7,547,472 B2 * | 6/2009 | Chen et al. | 428/367 |
| 7,685,668 B2 * | 3/2010 | Tourigny | 15/104.001 |
| 7,917,966 B2 * | 3/2011 | Kim et al. | 850/58 |
| 2002/0088073 A1 * | 7/2002 | Kammerer et al. | 15/209.1 |
| 2002/0197738 A1 * | 12/2002 | Matsumoto et al. | 436/518 |
| 2003/0066956 A1 * | 4/2003 | Gruber et al. | 250/251 |
| 2007/0074360 A1 * | 4/2007 | Gurley | 15/118 |
| 2007/0298168 A1 * | 12/2007 | Ajayan et al. | 427/249.1 |
| 2008/0119776 A1 * | 5/2008 | Wu | 604/1 |
| 2008/0184513 A1 * | 8/2008 | Tourigny | 15/210.1 |
| 2008/0280137 A1 * | 11/2008 | Ajayan et al. | 428/375 |
| 2009/0090376 A1 * | 4/2009 | Wang | 132/75.3 |
| 2009/0196909 A1 * | 8/2009 | Cooper et al. | 424/445 |
| 2012/0077398 A1 | 3/2012 | Gaillard et al. | |

OTHER PUBLICATIONS

Ge, Liehui, et al., "Carbon nanotube-based synthetic tapes", PNAS, vol. 104, No. 26, pp. 10792-10795, Jun. 26, 2007.
Correa-Duarte, et al. "Fabrication and Biocompatibility of Carbon Nanotube-Based 3D Networks as Scaffolds for Cell Seeding and Growth", Nano Letters, vol. 4, No. 11, pp. 2233=2236, 2004.

* cited by examiner

*Primary Examiner* — Monica Carter
*Assistant Examiner* — Michael Jennings
(74) *Attorney, Agent, or Firm* — Francis J. Caufield

(57) ABSTRACT

Methods and apparatus for the removal of foreign matter, such as oil and dust, from the end faces of optical fiber and optical fiber connectors. Cleaning is effected by bringing carbon nanotube material into contact with an end face to create a differential adhesion in the proximity of the end face that more strongly attracts foreign matter residing on the end face to the carbon nanotube material than its attraction to the end face. The carbon nanotube material is applied with cleaning swabs or tapes that are used to clean end faces with swiping actions.

4 Claims, 6 Drawing Sheets

(Prior Art From US Patent No. 5,117,528)

MICROPATTERNS OF VERTICALLY ARRANGED CARBON NANOTUBE ARRAYS

MESH NANOTUBE ARRANGEMENT

METHOD AND APPARATUS FOR CLEANING A FIBER OPTIC CONNECTOR END FACE

CROSS REFERENCE TO RELATED APPLICATION

This application claims the benefit of priority from U.S. Provisional Patent Application No. 61/350,983 filed on Jun. 3, 2010 in the name of Stephen M. O'Riorden, et al. and entitled METHOD FOR CLEANING A FIBER OPTIC CONNECTOR ENDFACE, the entire contents of which are incorporated herein by reference.

FIELD OF THE INVENTION

This invention generally relates to optical fiber and fiber optic connectors and specifically to methods and apparatus for cleaning their end faces.

BACKGROUND OF THE INVENTION

It is critical to keep an optical connector end face clean to allow for proper transmission, and thus, reduce any loss of data during use. Traditionally copper, connectors have been modified to accept termini containing optical fiber. The core of the fiber where the light is carried is roughly 9 µm for a singlemode fiber and is, typically, 50 µm or 62.5 µm for multimode fiber. Core diameters can be as large as 100 µm or greater for specialty multimode fiber. Dust particles can be of similar size—between 10 and 100 µm. Consequently, dust and grime have the potential for blocking light used to carry information. When dust is on the core of a fiber, it absorbs light that would otherwise be transmitted through the core. At best, it will attenuate some of the data being transmitted. At worst, it will absorb enough energy to burn and cause a catastrophic failure of the connector. Particles of carbon are particularly good absorbers of electromagnetic radiation and thus can heat-up very rapidly to burn. Also, during the cleaning process, the dust particles can cause damage to the connector end face as a scratch or pit that would require a repolishing to be removed.

There are many conventional methods available today for cleaning a fiber optic connector. However, each suffers from its own limitations. The most common approach depicted in the avionics maintenance manual uses specialty swabs for removing contaminants. While most experts on cleaning agree that this approach is the most effective, it unfortunately is a slow process that creates a significant amount of foreign object damage (FOD), it is costly, and the cleaning supplies are cumbersome to use in the confined spaces typically found in avionic environments.

Fiber optic connectors are typically physical contact type connectors, which means that the ceramic ferrule (with glass fiber in the middle) is physically touching the ceramic ferrule of another connector. These connectors meet end-to-end and are aligned with a ceramic alignment sleeve, or the like, to make certain that the small core of a fiber, through which the light is transmitted, is precisely aligned with the core of the mating fiber. In this way, the amount of light is transmitted across the connection interface is optimized.

When a connector is prepared, the tip of the connector, known as the end face, is ground down and polished to a smooth surface that makes it compatible with other connectors when placed face-to-face in physical contact. FIG. 1 shows the cross-section of the industry accepted geometry for a connector end face as described in GR-326. The polished surface is convex so as to ensure that the fiber's core touches before touching surrounding fiber cladding or ferrule material.

The purpose of these defined geometric requirements is to provide for physical contact of the mated fibers at all times. Fiber optic connectors work by transmitting light from one fiber across the connection interface and into the mating fiber. A certain amount of loss at this interface is unavoidable and allowed. The loss in transmission occurs from one or a combination of several different factors.

Light can be lost during transmission from the reflections at the interface, from inferior surface quality, or from an angular mismatch. Losses at the connection point can also occur due to lateral offset of the ferrules and/or fiber, angular misalignment, or an end separation which causes the two connectors not to be in physical contact.

It will be appreciated that the pressure at the end face contact point is large, and if there is any contamination at this point, damage can be done to the connector requiring a timely, labor intensive repolish.

There are several types of contamination that can occur on a connector end face, and there are several ways by which a connector can become contaminated.

Loose Contamination: Loose contamination is debris on the end face surface such as dirt, dust, streaks, oil, grease or metallic particles that are not permanent and can be removed with proper cleaning Fixed Contamination: Fixed contamination is material on the surface that cannot be removed such as cured epoxies, stains, and embedded metallic particles.

Fixed contamination requires a repolish to remove the debris, but loose contamination can be removed, and thus avoid becoming fixed contamination (i.e. embedded material) and avoid causing a defect in the end face such as a scratch, pit, crack or chip Contamination in the core area can block light from passing through the connector and cause high insertion loss. Also, if the contamination is a highly absorbing material such as carbon, under high power conditions it can absorb light and cause the fiber to melt. FIG. 2 shows, for example, a connector end face contaminated with oil.

Connectors can become contaminated only while they are unmated and when the end face is exposed to potential contaminants. If a connector end face comes in contact with a dirty surface while unconnected, contaminants will likely stick to the end face. This typically happens during equipment maintenance, when a technician removes a connector and fails to place a protective end cap over the ferrule. There is also the possibility of touching the connector end face with one's fingers, which is where the majority of oil contaminations originate.

Also, even in cases where a dust cap is installed while a connector is disconnected, contaminants can be introduced through the installation of the dust cap. Because of this, connectors are universally inspected before they are reinstalled into the adapter and mated to the associated connector. A universally accepted inspection template is IEC 61300-1, and in addition, many private companies have their own standards for end face acceptance.

In addition to the many more manual methods for cleaning end faces, such as KimWipes® and cotton swabs, there are many commercial-off-the-shelf (COTS) devices to clean connector end faces. The most popular device is the Cletop® (and there are several variants commercially available). This device employs a reel of cleaning material as shown in detail in FIG. 3. After depressing a lever on the device, a protective window opens and a new, clean strip of material is introduced where the technician can wipe the connector in a linear manner along the cleaning media.

This device has its limitations in that it can only clean connectors that are removed from their adapters. Most of the time both connectors cannot be removed from their adapter for cleaning. One connector will remain behind a patch panel and can only be cleaned through the adapter: There are special cleaners for this situation, an example of which is shown in FIG. 4.

This type of cleaner works much in the same way that the Cletop cleaner works in that it has a thin strip of cleaning material at its tip, which rubs along the face of the connector in order to clean it. The tip is designed to be small enough to fit into a standard adapter and further into the mating sleeve of the adapter.

Westover's Cleanblast® System utilizes a filtered stream of pressurized gas in conjuction with a vacuum to create a high flow rate jet across the surface of the fiber. A complete system requires a base unit and a cleaning tip suitable for the connector being cleaned. Portable systems have a built-in compressor and require a source of power.

Some units clean with a thin strip of cleaning media and dispense a cleaning solvent simultaneously. An internal picture of such a device is shown in FIG. 5.

It is therefore a principle object of the present invention to provide an improved apparatus and methodology for cleaning optical fiber end faces.

Yet another object of the invention is to provide optical fiber end face cleaning apparatus and methods by which cumbersome accessories need not be used.

It is yet another object of the present invention to provide improved apparatus and methodology that uses carbon nanotube technology as a cleaning media.

Other objects of the invention will be obvious and will, in part, appear hereinafter when the following detailed description is read in connection with the appended drawings.

SUMMARY OF THE INVENTION

Methods and apparatus for the removal of foreign matter, such as oil and dust, from the end faces of optical fiber and optical fiber connectors. Cleaning is effected by bringing carbon nanotube material into contact with an end face to create a differential adhesion in the proximity of the end face. The differential adhesion more strongly attracts foreign matter residing on the end face to the carbon nanotube material than its attraction to the end face. Consequently, removing the CNT material from the end face removes any foreign matter or contamination. The carbon nanotube material is applied with cleaning swabs or tapes that are used to clean end faces with swiping actions. The inventive swabs and tapes using carbon nanotube adhesive technology to clean fiber end faces greatly reduces the likelihood of damage to the end face. The invention offers significant advantages such as increased efficiency and reduced cross contamination over traditional cleaning methods, including Teflon type tape.

BRIEF DESCRIPTION OF THE DRAWINGS

The structure, operation, and methodology of the invention, together with other objects and advantages thereof, may best be understood by reading the detailed description in connection with the drawings in which each part has an assigned a label and/or numeral that identifies it wherever it appears throughout the various drawings and wherein.

DETAILED DESCRIPTION

The present invention employs carbon nanotube media in combination with a variety of architectures to provide enhanced cleaning of optical fiber end faces whether readily accessible for contact cleaning or recessed in tight spaces. As will be seen, the apparatus of the present invention offers vastly simplified approaches to conventional cleaning methods and, in addition, eliminates many of the usually required accessories.

One longstanding method of cleaning fiber optic connectors has been to use Teflon® tape. Often, this is used in conjunction with canned air. The solution of the present invention improves on the effectiveness of the tape so as to omit the, canned air as a necessary step in cleaning connectors. This is done by employing a novel type of adhesive: Carbon nanotube arrays. Adhesive tape formed by carbon nanotubes vertically aligned to the tape surface are often referred to as synthetic gecko tape.

Figure 1:
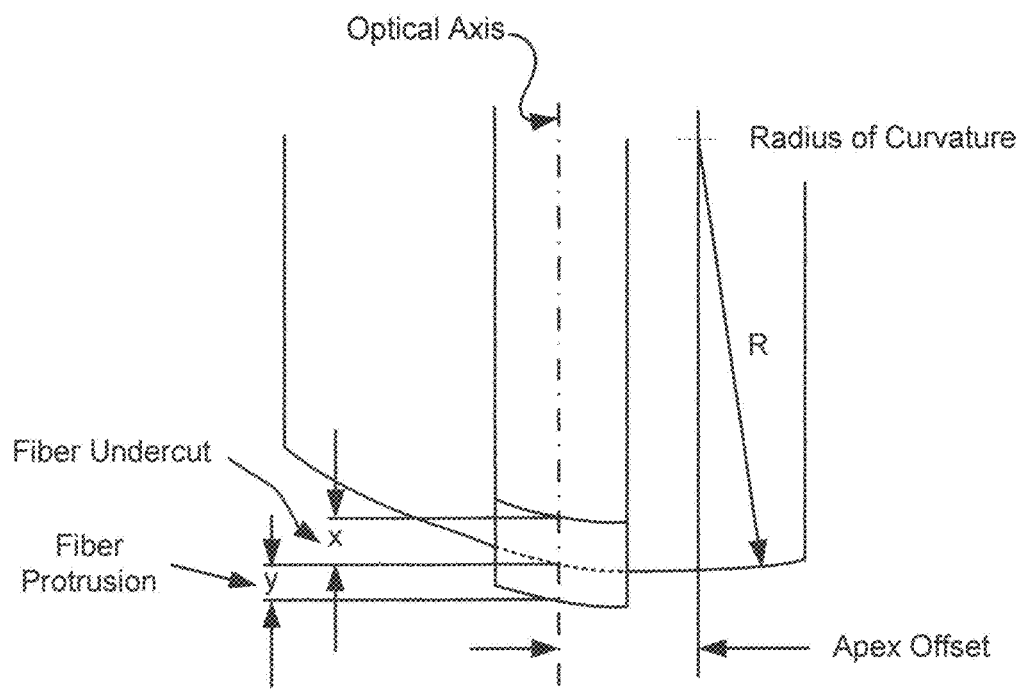
FIG. 1 diagrammatically shows a cross-section of the industry accepted geometry for a connector end face as described in GR-326.
Figure 2:
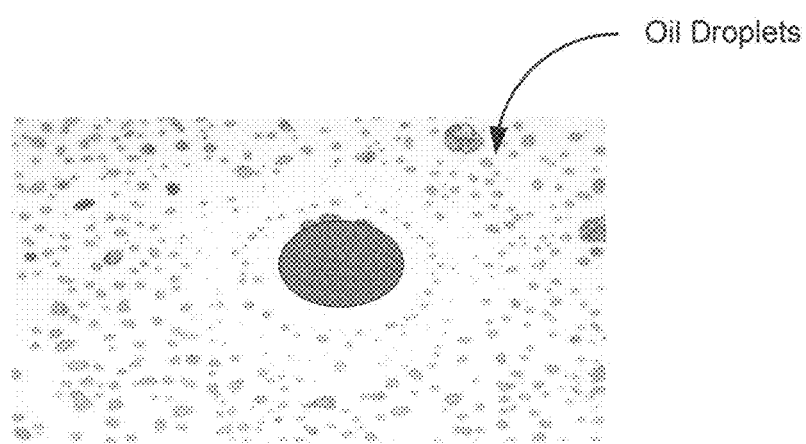
FIG. 2 shows a picture of a fiber end face contaminated with oil.
Figure 3:
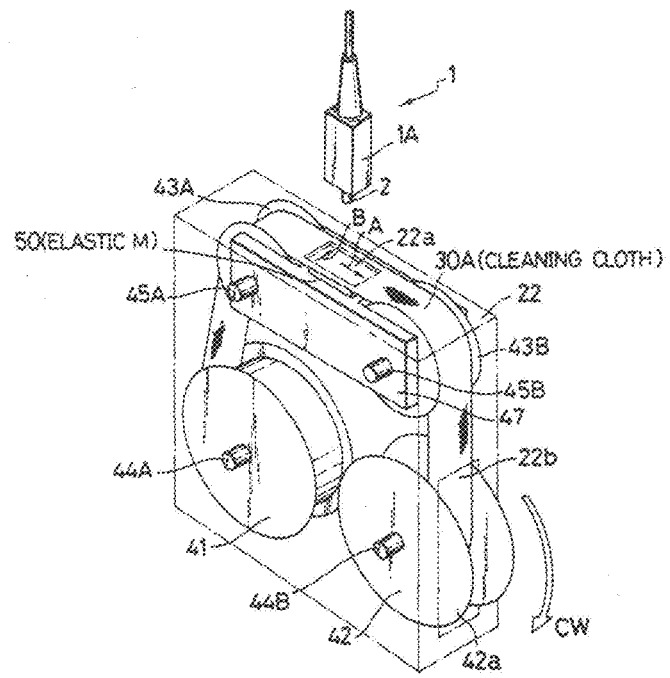
FIG. 3 shows a commercially marketed device employing a reel of material for cleaning a fiber end face.
Figure 4:
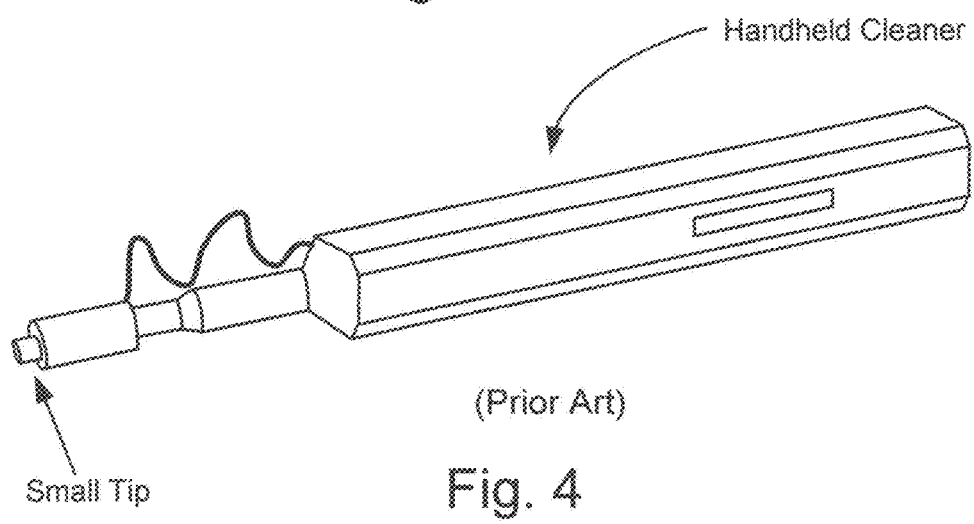
FIG. 4 shows type of cleaner having a tip small enough to fit into a standard adapter.
Figure 5:
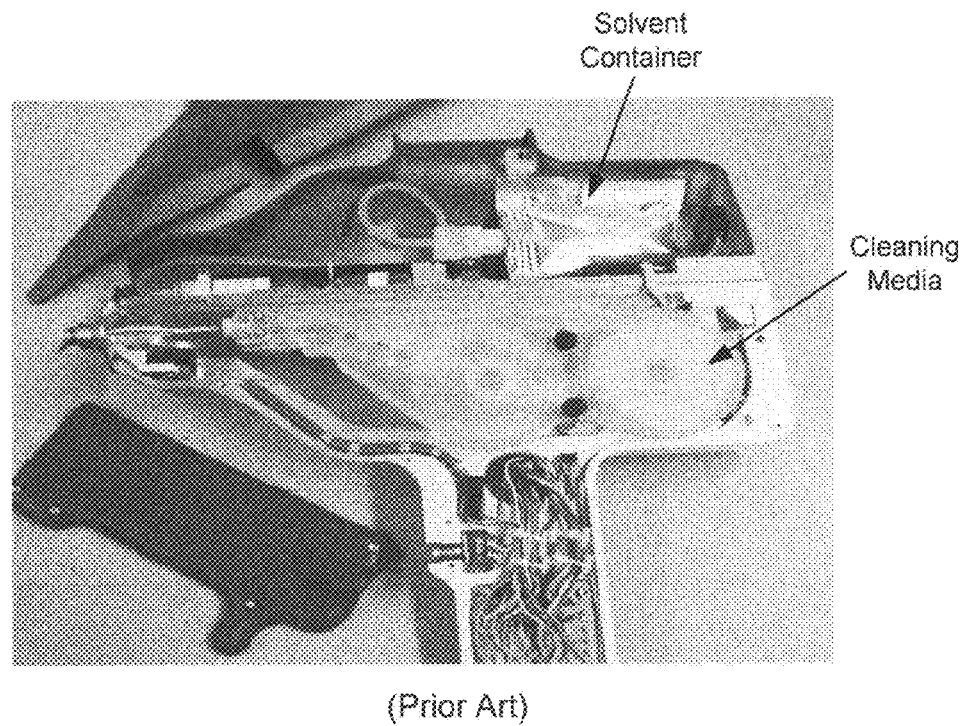
FIG. 5 shows a type of unit equipped with a thin strip of cleaning media and dispenses a cleaning solvent simultaneously.
Figure 6:
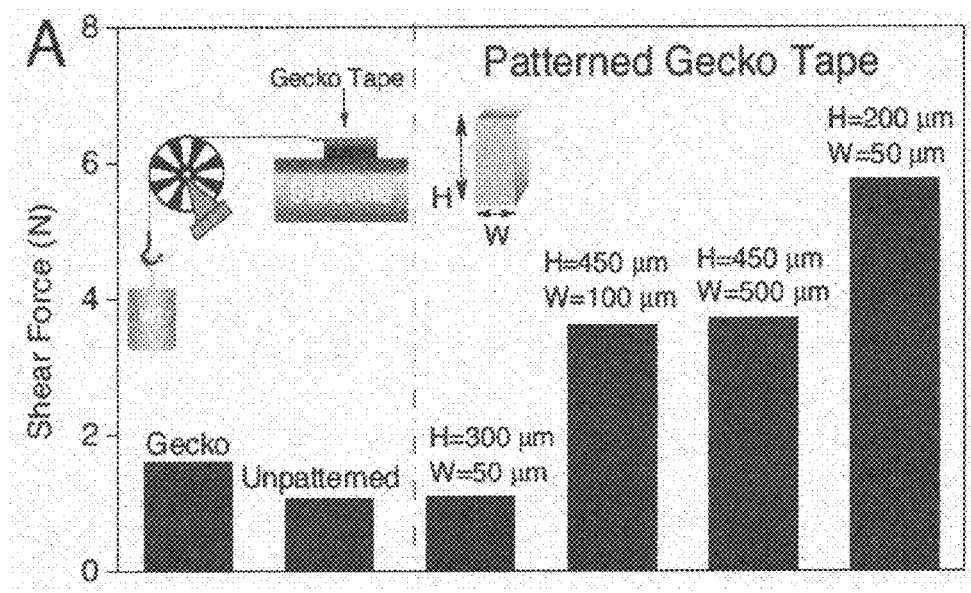
FIG. 6 shows the shear force for synthetic versus live gecko.

Carbon nanotube arrays are made of a hierarchical structure, consisting of microscopic hairs called setae (micrometer in size), which further split into hundreds of smaller structures called spatulas (nanometer in size). On coming in contact with any surface, the spatulas deform, enabling molecular contact over large areas, thus translating weak van der Waals interactions into enormous attractive forces. They also stick to both hydrophobic and hydrophilic surfaces, and do so without using viscoelastic liquids. FIG. 6 shows shear forces for synthetic gecko tape vs. a live gecko (See e.g. Ge, L (2007) *Carbon nanotube-based synthetic gecko tapes*. PNAS vol. 104 no. 26).

Figure 7:
FIG. 7 shows a micropatterned nanotube array on a flexible polymer tape.

Available from several commercial suppliers, vertically aligned carbon nanotubes, are based on the gecko foot structure made by transferring micropatterned nanotube arrays onto flexible polymer tape (see FIG. 7). This synthetic tape can support a shear stress of 36 N/cm$^2$. The shear strength is similar to Scotch® tape, but offers an advantage in two areas. First, while viscoelastic tapes adhesive properties decrease greatly with use and time, carbon nanotube based adhesives maintain their adhesive properties over time, and thus, have the potential for being reused. Second, this nanotube based adhesive has unique properties which do not require it to be pressed onto the surface as do soft sticky materials like Scotch tape, but rather the fibers engage by being brought into contact with a surface or once touching dragged parallel to or rotated with respect to the surface with minimal normal force. This "frictional adhesion" allows the media to be a hybrid cleaning media combining the best of the swab (abrasion) type cleaners and tape based cleaning methods. Also, the reduced pressure required for cleaning a connector end face with carbon nanotubes helps to alleviate any cleaning induced end face damage (i.e., scratches or pits) that may occur as a result of conventional cleaning methods, like wiping with an abrasive material or pressing against a Teflon type tape. FIG. 7 shows gecko foot satae in lobes and under SEM (left) and synthetic 100 um satae and under SEM (right).

Figure 8:
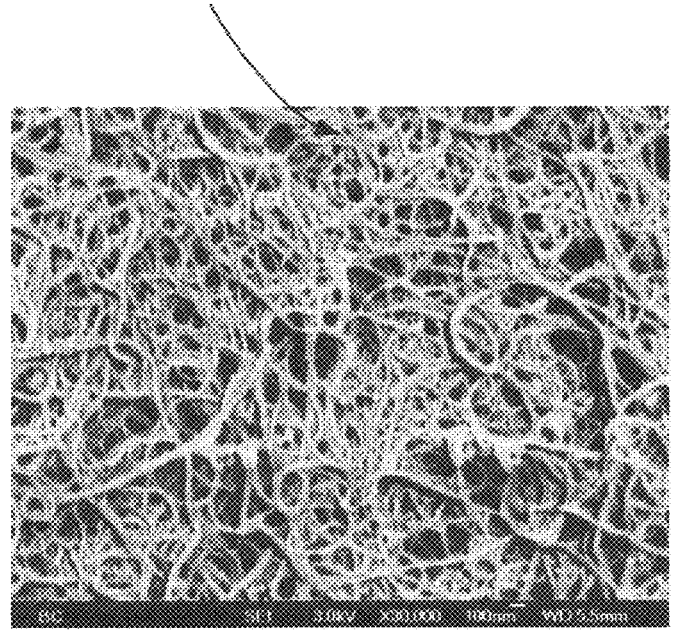
FIG. 8 shows a carbon nanotube 3D array arrangement where the nanotubes are aligned in an overlapping and intertwined meshlike manner.

Carbon nanotubes arrays can be patterned in many different ways, including, but not limited to; vertically aligned, as described above, where the carbon nanotubes are aligned in parallel and are perpendicular to the cleaning surface of the fiber optic connector; 3D array where the carbon nanotubes are aligned in an overlapping and intertwined mesh-like manner as shown in FIG. 8. Both of these patterns have been shown to have good cleaning properties and may be incorporated into a number of cleaning tools in, for example, the form of swabs or tape dispensers, and the like.

Figure 9:
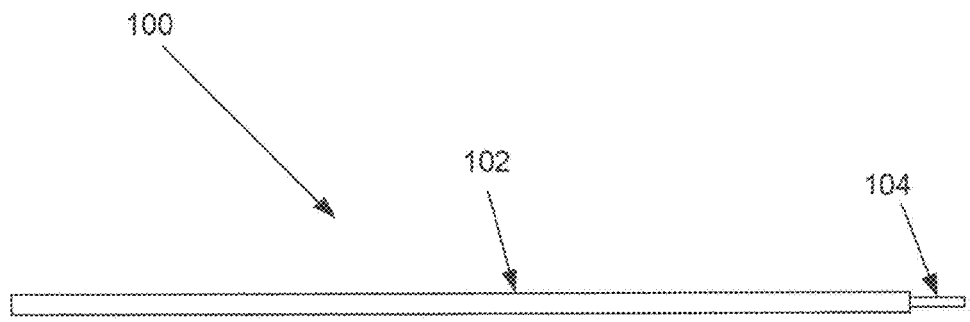
FIG. 9 is a diagrammatic plan view of a cleaning swab in accordance with the invention.

One design for a cleaning swab is shown in FIG. 9 where it is designated generally at 100. The swab 100 comprises a handle 102 and a cleaning element 104. The handle 102 is typically a disposable material made from molded plastic and may be 4" to 6" long.

The cleaning element 104 which is made of a micropattern of carbon nanotube material is produced as follows. Carbon nanotube (CNT) cleaning material is grown in well-known manners on a suitable substrate that must withstand the temperature and chemical environment used in the CNT growth process. This substrate is then diced into small pieces that are of the order of a few millimeters in cross-section. The thickness of the diced pieces is equal to the thickness of the substrate used for CNT growth plus the thickness of the CNT grown. These small diced cleaning elements 104 are then attached to the end of the handle 102 as shown in FIG. 9 by methods such as crimping or fastening with epoxy. The cross-section of the cleaning elements 104 is dimensioned so that it is small enough to be inserted into the openings in which female optical connector end faces reside.

Figure 10:
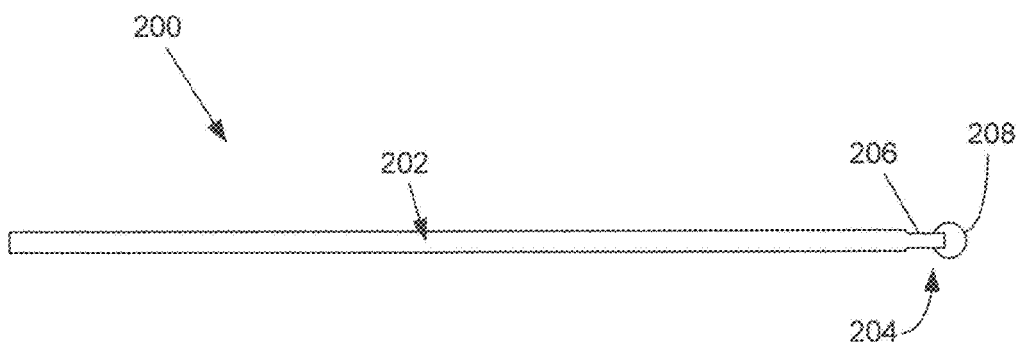
FIG. 10 is a diagrammatic plan view of another cleaning swab in accordance with the invention.

A second design for a cleaning swab is shown in FIG. 10 where it is generally designated at 200. The swab 200 comprises a handle 202 and a cleaning element genrally designated at 204. In this case, the handle 202 is made of a suitable material which will withstand the temperature and chemical environment used in the CNT growth process. The handle 202 is shaped such that one end is a tip 206 thin enough to be inserted into the openings in which female optical connector end faces reside. Several of these handles 202 are appropriately positioned as an array in the chamber in which CNT 208 is grown. This is done by using a suitably designed holder for a multiplicity of handles. The CNT 208 is grown directly on thinned tips 206 of the handles 202. Because of the nature of CNT growth, it is probable that the CNT 208 grows not only on the tip of the handle but also extends to some extent along the length of the handle. The extent of growth along the length can be controlled as necessary by adjusting the CNT growth parameters. Although FIG. 10 shows the CNT 208 grown on the tip handle as having a spherical shape, it will be understood that the actual shape will be arbitrary and in the nature of a growth conforming to the shape of the tip of the handle 202.

It will be understood that the foregoing cleaning swabs may be packaged individually or as bundles, such as arrays, in suitable packing arrangements that protect them from their ambient surroundings until needed for use.

Figure 11:
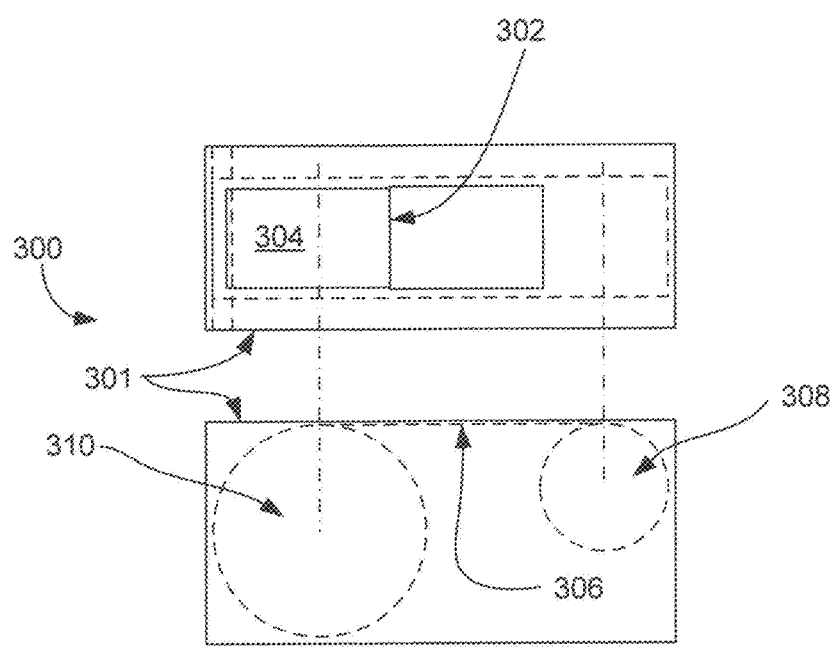
FIG. 11 diagrammatically shows top and elevational views of a tape dispenser in accordance with the invention.

In some instances, when cleaning a male fiber optic connector for example, it is better to have a cleaning media in a tape format so the connector can be swiped across the CNT cleaning material. FIG. 11 shows a cleaning configuration where a tape dispenser 300 has a housing 301 provided with an opening 302 where one can access a tape of CNT cleaning material 306. A sliding door 304 may be used to protect the cleaning material 306 from contamination when not in use. A connector can be swiped across the exposed CNT cleaning material 306 located in window 302 and be cleaned in this manner. CNT is grown on a substrate in the tape format 306 and the tape with CNT is located inside the tape dispenser 300 on a payout reel 308 that pays out material onto a take up reel 310. After each cleaning, the user advances the CNT tape cleaning material 306 with a well-known mechanism designed to advance the material one window length so that each time the cleaning tool is used a new clean section of material is exposed. With any of the swab embodiments, and also with the tape dispenser, an optical fiber end face may be cleaned by simple touch or more elaborate relative motion between the CNT material and the end face such as swiping and/or rotating of the two with respect to one another. It will also be appreciated that cleaning fiber end faces also means cleaning fiber optic connector parts in which the fiber end face may reside since the act of cleaning the fiber end face will involve cleaning nearby connector surfaces.

Having described the invention with reference to specific methodology and embodiments, those in the relevant art will recognize that other variants may be realized based on the teachings of the invention and those variants are intended to be within the scope of the appended claims.

What is claimed is:

1. A swab for cleaning the end face of optical fibers and fiber optic connectors comprising:
    an elongated handle by which the swab can be manually manipulated, said elongated handle having end surfaces generally perpendicular to the longitudinal dimension of said elongated handle, the cross-section of said end surfaces being dimensioned to be small enough to be inserted into the openings of female optical connectors where fiber end faces reside; and
    a material consisting of carbon nanotubes attached to at least one of said end surfaces of said longitudinal handle so that said carbon nanotubes can be brought gently into contact with a connector end face and moved with respect to it with said elongated handle, said material consisting of an array of carbon nanotubes to attract by differential adhesion unwanted foreign matter, that may be present on the optical fiber end face, to said carbon nanotubes so that, upon separation of said array of carbon nanotubes from the optical fiber end face, foreign matter is carried away with said material.

2. The swab of claim 1 wherein said elongated handle is made of plastic and and further comprising glue for attaching said carbon nanotubes to at least one end surface of said elongated handle.

3. The swab of claim 1 wherein said handle is made of a high temperature material and said carbon nanotube material is grown directly on one end of it.

4. The swab of claim 1 wherein said carbon nanotubes are selected from the group comprising vertically aligned parallel nanotube arrays and overlapping and intertwined meshes.

\* \* \* \* \*